(12) United States Patent
Lind

(10) Patent No.: US 8,122,853 B2  
(45) Date of Patent: Feb. 28, 2012

(54) COMBINATION OF A CARRYING DEVICE AND AT LEAST ONE DOG TOY

(75) Inventor: Ekard Lind, Mettersdorf (AT)

(73) Assignee: Elation Inc., San Jose, CA (US)

( * ) Notice: Subject to any disclaimer, the term of this patent is extended or adjusted under 35 U.S.C. 154(b) by 98 days.

(21) Appl. No.: 12/636,789

(22) Filed: Dec. 14, 2009

(65) Prior Publication Data

US 2010/0147228 A1  Jun. 17, 2010

(30) Foreign Application Priority Data

Dec. 19, 2008 (DE) .......... 10 2008 063 897

(51) Int. Cl.
*A01K 29/00* (2006.01)
(52) U.S. Cl. ......... 119/709; 119/702; 119/707; 119/708
(58) Field of Classification Search .............. 119/702, 119/707, 708, 709
See application file for complete search history.

(56) References Cited

U.S. PATENT DOCUMENTS

| | | | | |
|---|---|---|---|---|
| 2,570,733 A * | 10/1951 | Thomas | ........................ | 119/72 |
| 3,830,202 A * | 8/1974 | Garrison | ...................... | 119/709 |
| 4,309,038 A * | 1/1982 | Spoon | ............................ | 473/596 |
| 4,802,444 A * | 2/1989 | Markham et al. | ............. | 119/710 |
| 4,928,977 A * | 5/1990 | Chambers | ..................... | 473/569 |
| 5,560,320 A * | 10/1996 | Plunk | ............................ | 119/709 |
| 5,647,103 A * | 7/1997 | Foster | ............................. | 24/618 |
| 5,647,302 A * | 7/1997 | Shipp | ............................ | 119/709 |
| 6,688,258 B1 * | 2/2004 | Kolesar | ......................... | 119/710 |
| 6,883,211 B2 * | 4/2005 | Hoshino | ......................... | 24/663 |
| RE40,430 E * | 7/2008 | Markham | ...................... | 119/707 |
| 7,490,579 B2 * | 2/2009 | Axelrod | ......................... | 119/707 |
| 7,536,978 B2 * | 5/2009 | Washington et al. | ......... | 119/707 |
| 7,562,639 B2 * | 7/2009 | Ritchey | ......................... | 119/708 |
| RE40,872 E * | 8/2009 | Markham | ...................... | 119/707 |
| 2009/0000565 A1 * | 1/2009 | Bryce | ............................ | 119/707 |
| 2009/0038559 A1 * | 2/2009 | Markham | ...................... | 119/707 |

* cited by examiner

*Primary Examiner* — Joshua Michener
*Assistant Examiner* — Justin Benedik
(74) *Attorney, Agent, or Firm* — Ash Tankha; Lipton Weinberger & Husick

(57) ABSTRACT

To provide a combination of at least one motivational object for dogs, which comprises of a bite body, and a carrying device for the at least one motivational object, which comprises of a clamping element, on which the bite body of the motivational object is detachably secured, which allows for an easy carrying or storing of the motivational object while not in use, it is proposed that the bite body comprises a of a recess in which the insertion section of a clamping element of the carrying device is insertable in an insertion direction.

20 Claims, 12 Drawing Sheets

COMBINATION OF A CARRYING DEVICE AND AT LEAST ONE DOG TOY

CROSS REFERENCE TO RELATED APPLICATIONS

This application claims the benefit of non-provisional patent application number 10 2008 063 897.8 titled "Combination Of A Carrying Device And At Least One Dog Toy", filed on Dec. 16, 2008 in the German Patent And Trade Mark Office.
The specification of the above referenced patent application is incorporated herein by reference in its entirety.

TECHNICAL FIELD OF THE INVENTION

This invention relates to the combination of at least one toy or motivational object for dogs, including a bite body, and a carrying device for the at least one toy or motivational object for dogs, which includes a clamping element, on which the bite body of the motivational object is detachably secured.

BACKGROUND

With known carrying devices, carrying and storing dog toys or motivational objects when not in use is often cumbersome.

SUMMARY OF THE INVENTION

The purpose of the present invention is to provide a combination of the aforementioned type, which allows an easy carrying or storing of a motivational object while not in use.

According to the present invention, this challenge is met by providing a recess in the bite body of the motivational object, which allows for the insertion of an insertion section of the clamping element in an insertion direction.

Because the insertion section of the clamping element of the carrying device is insertable into the recess of the bite body, the at least one motivational object is particularly easy and detachably secured on the carrying device. This way, the object can be quickly stowed away at the place provided after its use, so the dog is not distracted by other events and looses its concentration.

Moreover, the present invention has the advantage that the motivational object can be quickly and easily ejected, in the best case without even looking at it.

It is favorable, if at least sections of the clamping element are of an elastic design. That way, a particularly rigid bite body can be mounted particularly easily detachable on the carrying device.

It is particularly favorable, if the bite body of the motivational object is made of rubber, natural rubber or a similar, rubber-like material; or is coated with rubber, natural rubber or a similar, rubber-like material.

Alternatively or additionally, it can be provided that the clamping element comprises a spring.

Preferably, a chosen diameter of the recess can be in-between for example approximately 0.3 mm and, for example approximately 0.5 mm smaller than the maximum expansion of the insertion section in a direction perpendicular to the insertion direction. That way, a tight fit of the motivational object is guaranteed and an unwanted release from the carrying device is effectively prevented.

One embodiment of the invention provides that an envelope of the bite body is at least approximately frustoconically shaped.

A further refinement of the invention provides that an envelope of the bite body is at least approximately cylindrically shaped.

It is favorable, if the insertion section of the clamping element comprises a convex protrusion. That way, an unwanted shifting of the motivational object on the carrying device is reduced or completely prevented.

It is particularly favorable, if at least sectionally, the convex protrusion spans in a circumferential direction perpendicular to the insertion direction.

A further refinement of the invention can provide for an in insertion direction tapered front-end of the clamping element. That way, a particularly easy insertion of the insertion section of the clamping element into the recess of the bite body is guaranteed.

A further embodiment of the invention provides for an in perpendicular direction to the insertion direction flattened insertion section of the clamping element. That way, a particularly easy and well-aimed insertion of the insertion section of the clamping element into the recess of the bite body is guaranteed.

A simple handling of the carrying device and the motivational object is particularly ensured, if at least the insertion section of the clamping element is at least approximately rotationally symmetrical relative to an axis of rotation parallel to the insertion direction.

A further embodiment of the invention provides that the insertion section has an at least approximately rhombic-shaped longitudinal section in insertion direction.

It is favorable, if the carrying device includes a strap for the hanging, suspending or wearing of the carrying device along with at least one motivational object.

For example, it can be provided that the strap is at least approximately 5 mm, preferably not more than approximately 25 mm in width.

In particular, provision may be made that the strap is intended for hanging it around a dog owner's neck or shoulder or for suspending it from a dog owner's belt or clothing.

Advantageously, the clamping element includes a feedthrough for a strap. That way, the clamping element can be easily mounted on a strap.

A further embodiment of the invention provides that the feedthrough is aligned in a transverse direction to a direction, in which the insertion section of the clamping element has its maximum extension in a direction perpendicular to the insertion direction.

In particular, if the feedthrough is at least approximately perpendicular to a direction, in which the insertion section of the clamping element has its maximum extension in a direction perpendicular to the insertion direction, a particularly simple handling of the clamping element and a simple insertion of the insertion section of the clamping element into the recess of the bite body is guaranteed.

Alternatively, it can be provided that the feedthrough is at least approximately parallel to a direction, in which the insertion section of the clamping element has its maximum extension in a direction perpendicular to the insertion direction.

It is favorable, if the recess of the bite body is at least approximately cylindrically shaped. That way, the bite body of the motivational object does not need to be turned into a preferred position to permit the insertion of the insertion section of the clamping element prior to its attachment to the carrying device.

It is particularly favorable, if the recess of the bite body is at least approximately complementary to a shape of the insertion section of the clamping element. This allows for a particularly stable connection between the bite body and the clamping element.

A further embodiment of the invention provides that the bite body comprises a protrusion that protrudes into a cavity formed by the recess. In particular, if the insertion section of the clamping element comprises a convex protrusion, the clamping element is particularly easily latched into the cavity of the bite body.

It is favorable, it the protrusion comprises of a steep sloping flank in insertion direction, particularly over a distance of not more than approximately 2 mm in insertion direction. That way, an unwanted slipping of the clamping element out of the recess in the bite body is effectively prevented.

A further embodiment of the invention provides that the protrusion comprises of a gently or flat sloping flank in a direction opposite to the insertion direction, particularly over a distance of at least approximately 10 mm in a direction opposite to the insertion direction. That way, a particularly easy insertion of the insertion section of the clamping element into the recess of the bite body is guaranteed.

In another embodiment of the invention can be provided that the bite body includes a concave indentation within its recess, which is shaped at least approximately complementary to the convex protrusion of the clamping element.

In a further embodiment of the invention can be provided that the recess of the bite body is arranged in a basal area of the bite body, particularly in a basal are adjacent to the bite area of the bite body.

Other features and benefits of the present invention are the subject of the following description and the technical drawings.

BRIEF DESCRIPTION OF THE DRAWINGS

Identical or functionally equivalent elements are provided with the same reference characters in all figures.

DETAILED DESCRIPTION OF THE INVENTION

Figure 1:
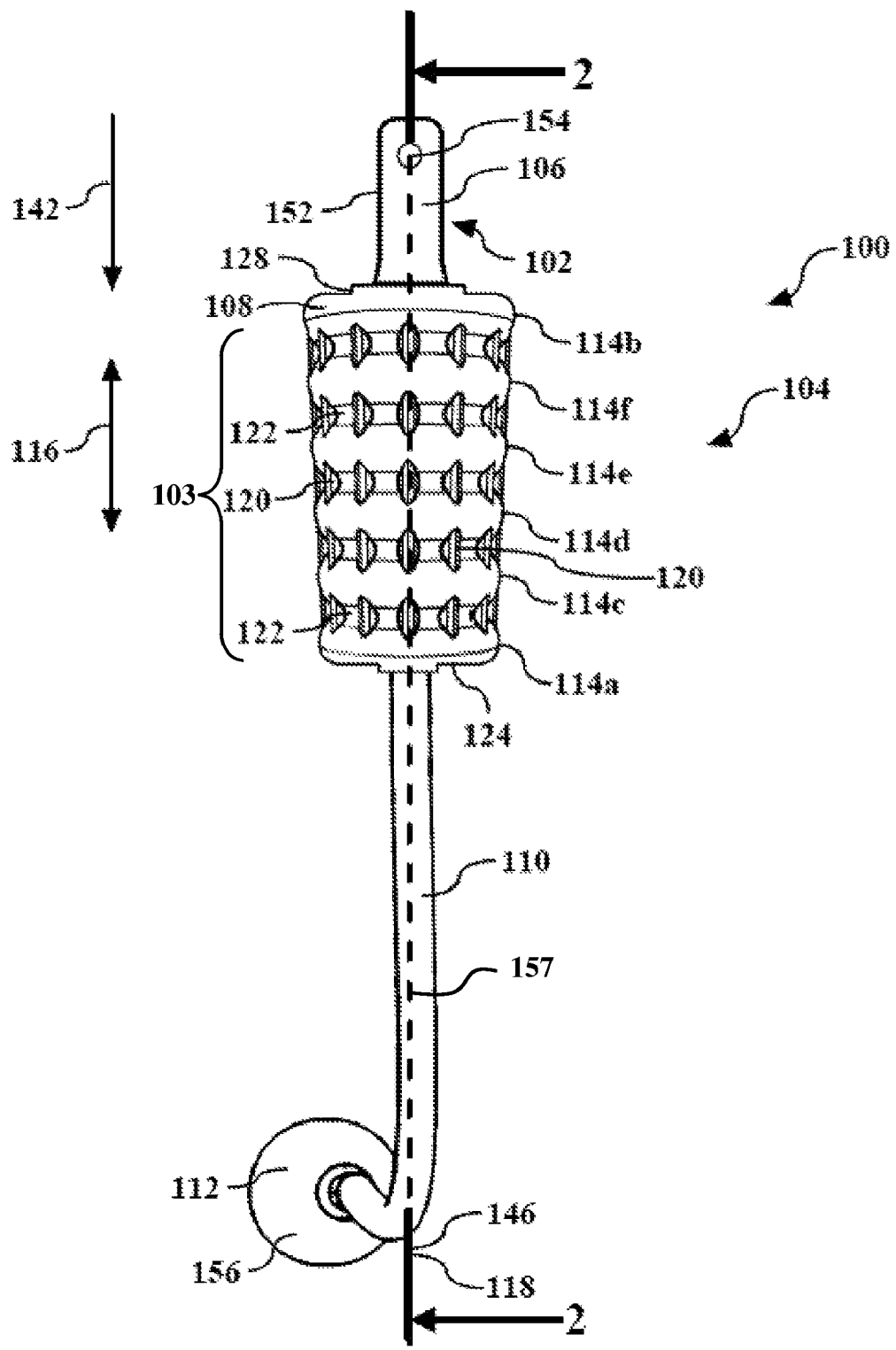
FIG. 1 illustrates a schematic, perspective view of a combination of a first embodiment of a carrying device and a first embodiment of a motivational object.

A combination 100 featured in FIGS. 1 through 3 and FIG. 13 comprises of a carrying device 102 and a motivational object 104.

The carrying device 102 includes one (to be described in more detail) clamping element 106 for the detachable mounting of a motivational object 104 on the carrying device 102.

The motivational object 104 comprises a bite body 108, a connecting element 110 that may be used for hurling or holding, and a handle 112.

The bite body 108 has an approximately conically shaped envelope 103 and several, for example six annular bulges 114a-114f, side by side, arranged in a longitudinal direction 116 parallel to the rotational axis 118 of the conically shaped envelope 103 of the bite body 108.

There are four annular bulges 114c, 114d, 114e, 114f arranged in-between a first outer annular bulge 114a and a second outer annular bulge 114b.

Several, for example twelve longitudinal webs 120 extend in longitudinal direction 116 between the adjacent annular bulges 114a, 114c; 114c, 114d; 114d, 114e; 114e, 114f; and 114f, 114b.

The longitudinal webs 120 extend in longitudinal direction 116 essentially over the entire length of the bite body 108, i.e. from the first outer annular bulge 114a to the second outer annular bulge 114b.

The annular bulges 114 and the longitudinal webs 120 provide an essentially grid-like pattern on the surface of the bite body 108, forming in one or two directions concave, or approximately spherical troughs 122 in each case between two annular bulges 114a, 114c; 114c, 114d; 114d, 114e; 114e, 114f; and 114f, 114b and two longitudinal webs 120.

A connecting element 110 is fixed essentially concentrically on one abutting face 124 of the conically shaped bite body 108. The connecting element 110 has a length of, for example, twice the length of the bite body 108 and is firmly connected to a handle 112 opposite to the abutting face 124. The handle 112 for example, could have a spherical shape.

The bite body 108 is, depending on its design for different breeds, for example between 5 cm and 12 cm in length and has a diameter of, for example 2.5 cm to 4.5 cm on its abutting face 124, and has a diameter of, for example 3 cm to 6 cm on a basal area 128 located opposite to the abutting face 124 on the bite body 108.

Provision may be made for the annular bulges 114 to have essentially sinus shaped waists. Alternatively, provision may be made that the annular bulges 114 are formed by essentially into another merging sections of spheres with pointed waists.

Figure 2:
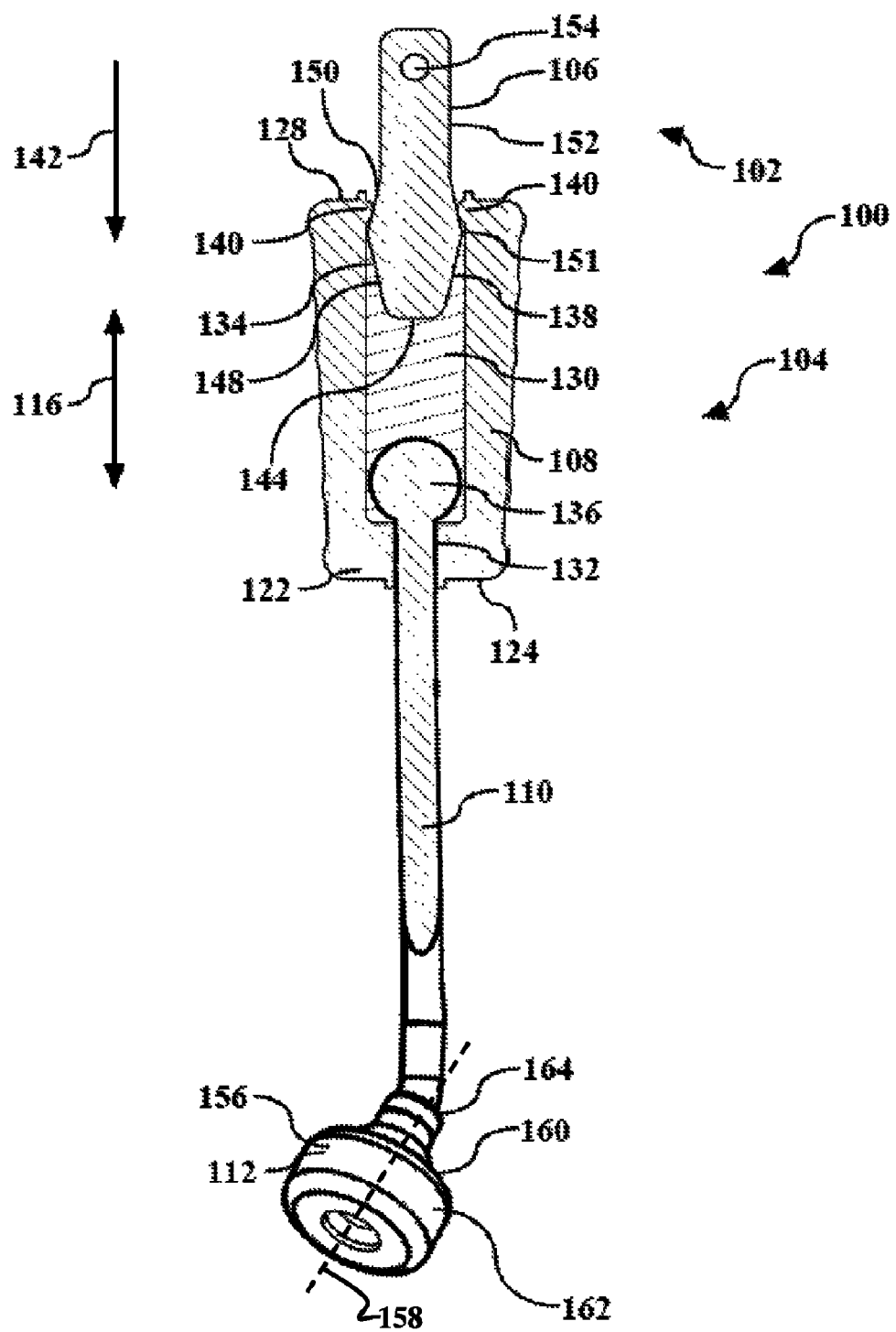
FIG. 2 illustrates a schematic, longitudinal section along the line 2-2 of the combination of a first embodiment of a carrying device and a first embodiment of a motivational object illustrated in FIG. 1.
Figure 3:
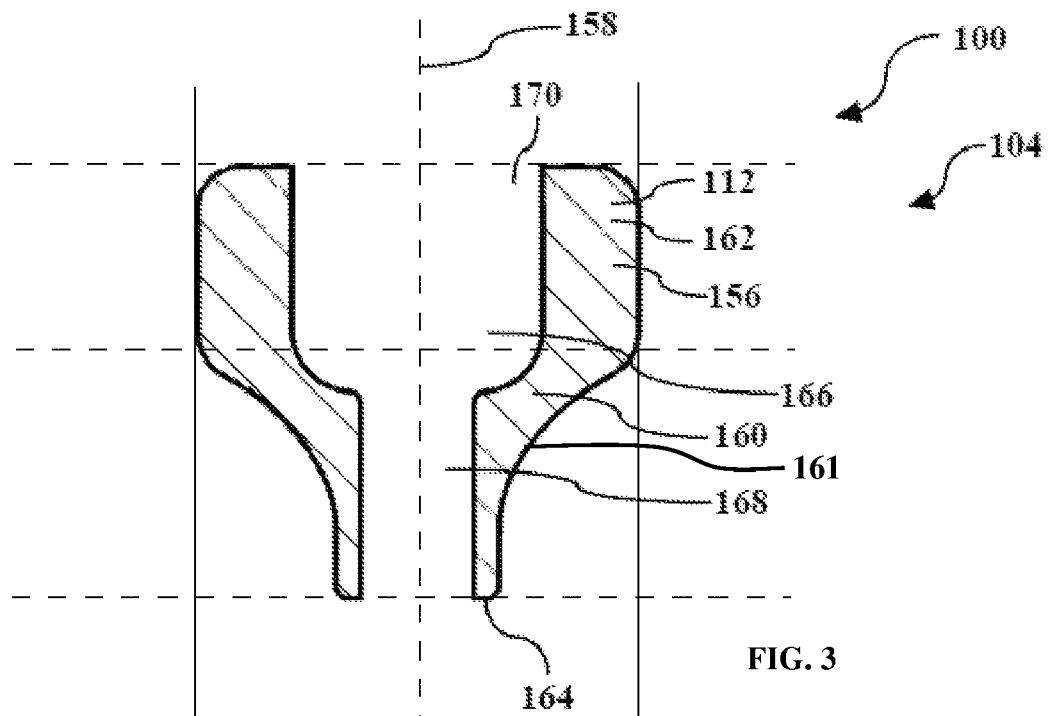
FIG. 3 illustrates a schematic, longitudinal section through a handle of the first embodiment of the motivation object in FIG. 1.
Figure 4:
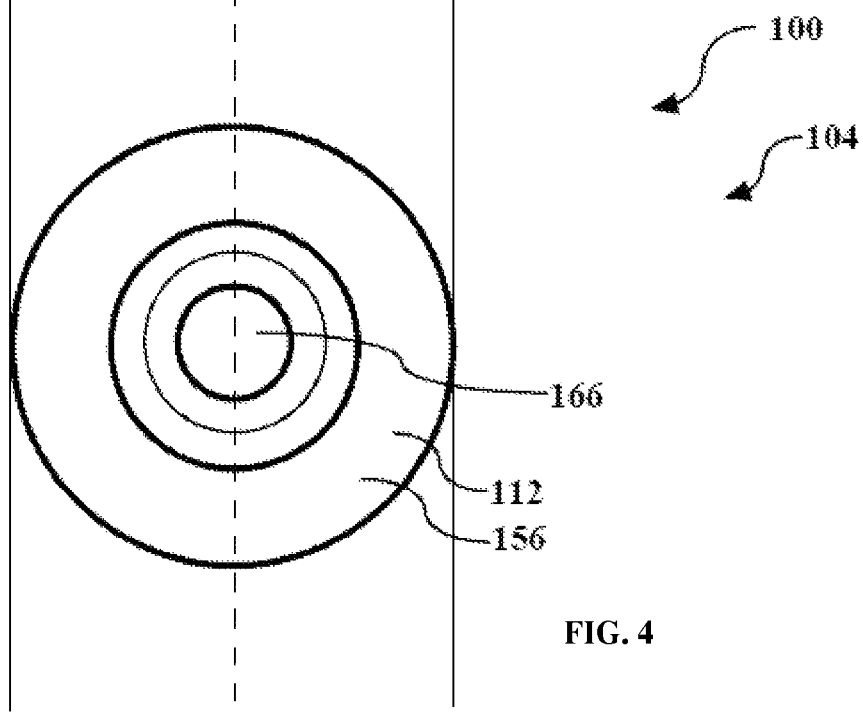
FIG. 4 illustrates a schematic, top view of the handle in FIG. 3.

As particularly illustrated in FIG. 2, the bite body 108 comprises of a feedthrough 130, which penetrates the bite body 108 essentially centrically in its longitudinal direction 116.

The feedthrough 130 in the bite body 108 contains a recess 132 for the connecting element 110 in its abutting face 124 as well as a recess 134 for the clamping element 106 in its basal area 128.

The connecting element 110 is insertable into the recess 132 of the feedthrough 130 in the bite body 108. The thickening 136 of the connecting element 110 prevents detaching of the connecting element 110 from the bite body 108.

The insertion section 138 of the clamping element 106 is insertable into the recess 134 for the clamping element 106. The insertion section 138 and the recess 134 for the clamping element 106 are fitted so that the bite body 108 clamps onto the clamping element 106, and thus the motivational object 104 is detachably mounted on the carrying device 102.

Figure 13:
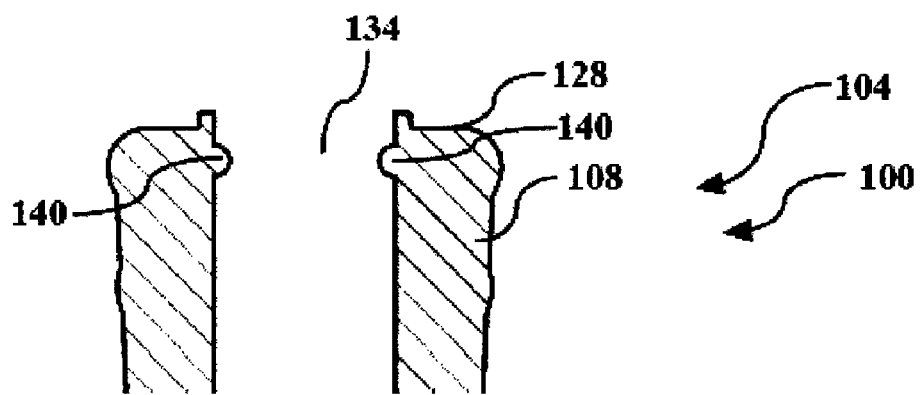
FIG. 13 illustrates a magnified schematic view of a recess of the bite body in FIG. 2 with a protrusion.

A simplified clamping of the clamping element 106 to the recess 134 for the clamping element 106 is particularly ensured by providing a protrusion 140 on the recess 134 for the clamping element 106, which preferably is of an elastic design (see FIG. 13). That way, the insertion section 138 can, after being inserted into the recess 134 for the clamping element 106, clamp behind the protrusion 140 to ensure a secure hold of the bite body 108 and thus of the motivational object 104 on the carrying device 102.

A simplified insertion of the insertion section 138 of the clamping element 106 into the recess 134 for the clamping element 106 in insertion direction 142 is particularly ensured by providing for a clamping element 106 with an in insertion direction 142 tapered front-end area 144 of the insertion section 138.

The recess 134 for the clamping element 106 as well as the clamping element 106 itself are built at least approximately rotationally symmetrical about the axis of rotation 157 of the clamping element 106 and at the same time, about the axis of rotation 157 of the bite body 108.

Figure 5:
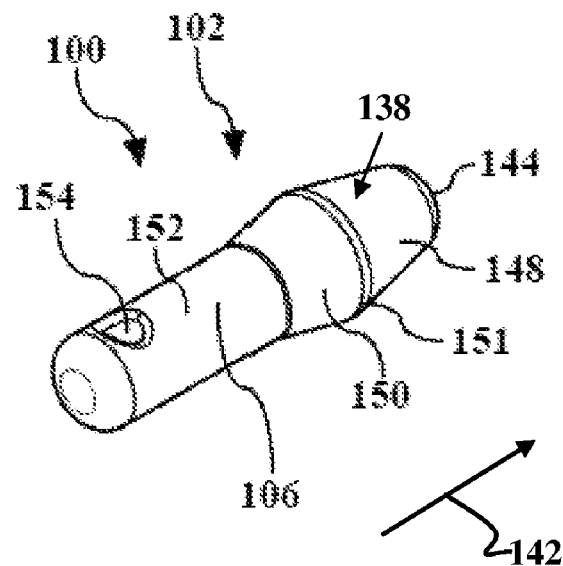
FIG. 5 illustrates a schematic, perspective view of the clamping element of the first embodiment of the carrying device of FIG. 1.
Figure 6:
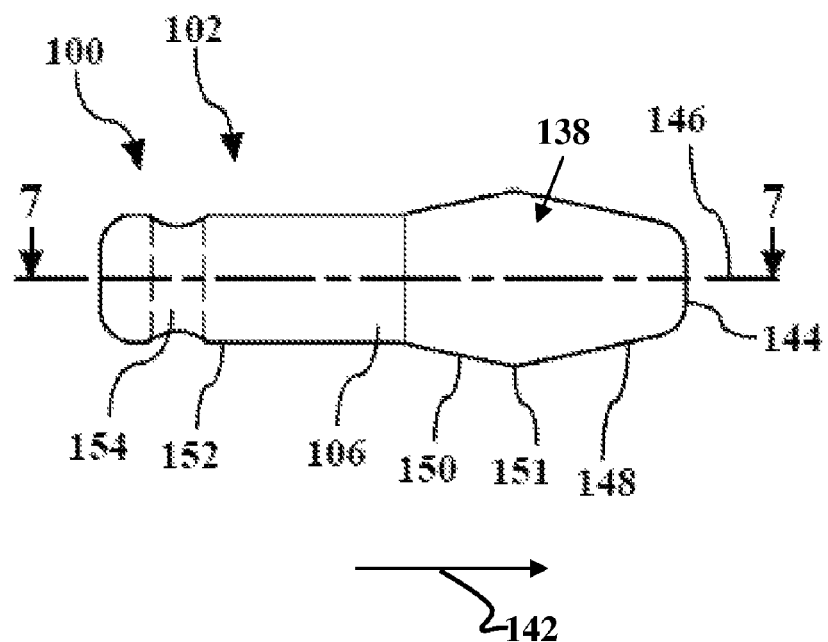
FIG. 6 illustrates a schematic, side view of the clamping element in FIG. 5.
Figure 7:
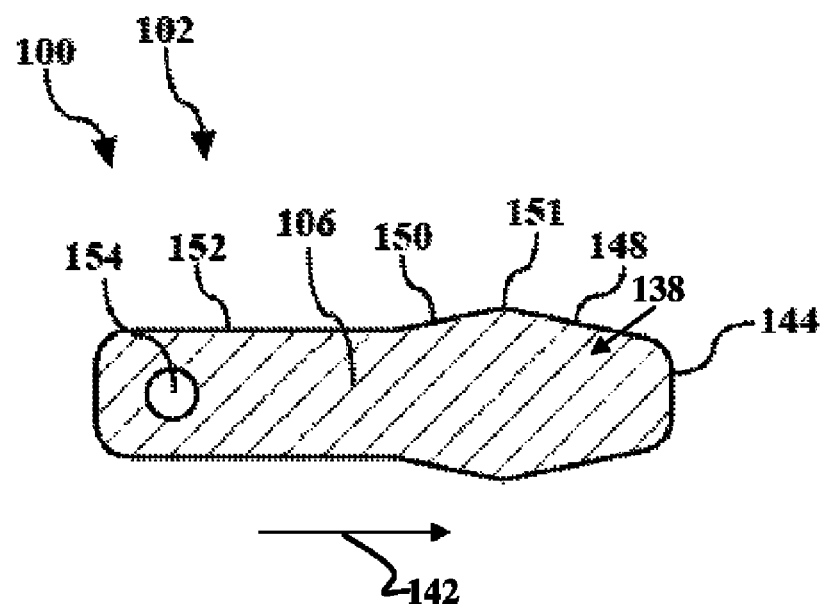
FIG. 7 illustrates a schematic representation of a longitudinal section through the clamping element in FIG. 5 along the line 7-7 in FIG. 6.
Figure 8:
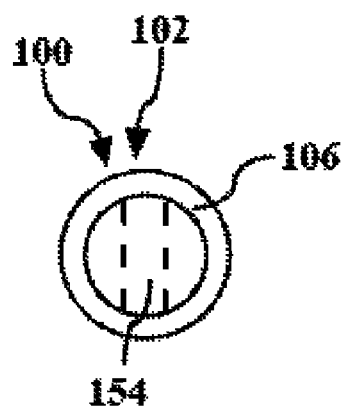
FIG. 8 illustrates a schematic, top view of the back side of the clamping element in FIG. 5.

As particularly shown in FIG. 5 through FIG. 7, the clamping element 106 comprises of a first insertion section 138, which has an at least approximately frustoconically shaped area 148 that is tapered in insertion direction 142, and a second, at least approximately conically shaped area 150 which is tapered in a direction opposite to the insertion direction 142.

A convex bulge 151 is formed by the at least approximately frustoconically shaped sections 148 and 150 of the clamping element 106.

Furthermore, the clamping element 106 comprises of an essentially cylindrical section 152 with a feedthrough 154 oriented perpendicular to the insertion direction 142 for feeding through a strap (not shown in this embodiment).

The handle 112 comprises of a holding device 156, which is at least approximately rotationally symmetrical about the axis of rotation 158 of the handle 112.

The holding device 156 comprises of a bite body 108 facing concave section 160, and a bite body 108 averted cylindrical section 162.

Along its concave section 160, the holding device 156 tapers in the direction of the bite body 108 facing end 164.

The holding device 156 also comprises of an opening 166 along its axis of rotation 158 which has an at least approximately cylindrical recess 168 in its concave section 160 and an at least approximately hemispherical recess 170 in its cylindrical section 162.

The opening 166 in the holding device 156 is used to receive the connecting element 110 which is lead through the at least approximately cylindrical recess 168 and then, for example, thickened by a knot (not shown). The knot rests in the at least approximately hemispherical recess 170 and prevents a slipping of the connecting element 110 through the at least approximately cylindrically shaped recess 168 and thus prevents a dropping of the handle 112 from the connecting element 110.

The holding device 156 has a decidedly thin wall thickness on its bite body 108 facing end 164, which increases in a concave shape 161 over a distance starting from approximately 6 mm to approximately 20 mm, preferably approximately 10 mm.

The connecting element 110 has a diameter of, for example between approximately 4 mm and approximately 14 mm, preferably between approximately 6 mm and approximately 10 mm. With a diameter of the connecting element 110 of, for example approximately 9 mm, the holding device 156 has a wall thickness of, for example between approximately 2 mm and approximately 6 mm, preferably between approximately 3 mm and approximately 4 mm on its bite body 108 facing end 164.

The wall thickness of the holding device 156 increases from the bite body 108 facing end 164 to its maximum value of, for example between approximately 20 mm and, for example approximately 38 mm, wherein the concave shape 161 results from the successive increase in wall thickness.

The cylindrical section 162 extends along the axis of rotation 158 of the holding device 156 over a distance of, for example approximately 4 mm to, for example approximately 14 mm.

The recess 170 in the holding device 156 has a diameter of, for example approximately 18 mm at the point of its widest expansion when using a connecting element 110 with a diameter of, for example approximately 9 mm.

The combination 100 of a carrying device 102 and at least one dog toy or motivational object 104 is used as follows:

A dog owner hangs the combination 100, for example, around the neck by means of the strap (not shown) on the carrying device 102 so that the bite body 108 of the motivational object 104 is approximately in height of the chest of the dog handler.

The handle 112 with the holding device 156 is then, for example, located approximately in height of the belt of the dog owner.

To use the motivational object 104, especially for throwing the motivational object 104, the dog owner reaches for the handle 112 with the hand. The dog owner grasps the concavely shaped section 161 of the holding device 156, preferably with the thumb and index finger, and with the remaining fingers the cylindrical section 162 of the holding device 156 to ensure a secure grip of the handle 112 in the hand of the dog owner.

The dog owner releases the motivational object 104 from the carrying device 102 with a simple jerk in gravitational direction. As a result, the insertion section 138 disengages from the recess 134 of the clamping element 106.

The dog owner hurls the motivational object 104 away by means of the movement of an arm.

This motivates the dog owner's dog to chase after the motivational object 104 and to catch it.

The dog will grip the bite body 108 of the motivational object 104, whereby its teeth will slide off the annular bulges 114 and longitudinal webs 120 and are guided into the troughs 122, thereby ensuring a secure hold of the bite body 108 in the muzzle of the dog.

Preferably, the dog returns the motivational object 104 to its handler so that the handler can hurl the motivational object 104 away again.

An alternative use to the game of toss with the motivational object 104 described above is achieved by having the handler hold on to the handle 112 while the dog is holding on to the bite body 108 with its muzzle.

During a mutual tugging of the motivational object 104, the handle 112 guarantees that the motivational object 104 does not slip from the handler's hand, and the annular bulges 114 and longitudinal webs 120 guarantee that the teeth of the dog does not slip from the bite body 108. In particular, the spherical troughs 122 formed by the annular bulges 114 and the longitudinal webs 120 prevent the teeth of the dog from slipping off of the bite body 108 in any direction.

After playing with the motivational object 104, the motivational object 104 can be carried or stored on the carrying device 102. The dog owner accomplishes this by holding on to the bite body 108 with one hand and to the clamping element 106 with the other hand, and by leading the insertion section 138 of the clamping element 106 into the recess 134 for the clamping element 106.

Afterwards, the dog owner has both hands free for other activities. In particular, the dog can then "heel" next to the handler just like it is required during obedience trials or competitions, wherein the position of the motivational objects 104 helps the dog's concentration on the handler and it encourages the dog to look up to the handler.

Moreover, this eliminates the permanent carrying of the motivational object 104 when not in use.

Figures 9A, 9B, 10, 11, 12:
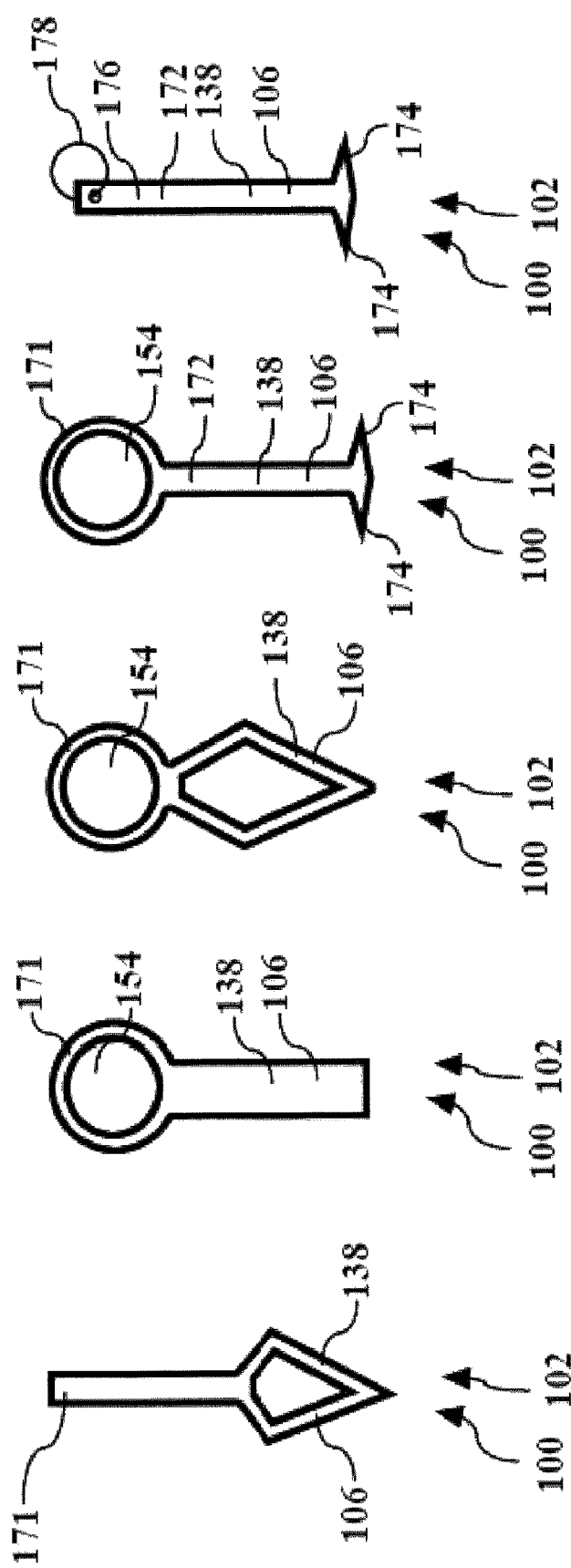
FIG. 9A illustrates a schematic side view of a second embodiment of the carrying device with an essentially arrow-shaped insertion section of the clamping element, and a parallel to its largest expansion in a direction perpendicular to the insertion direction oriented feedthrough as lead-through for a strap.
FIG. 9B illustrates a schematic, side view of the second embodiment of the carrying device in FIG. 9A, facing in the direction of the arrow 9b in FIG. 9A.
FIG. 10 illustrates a schematic view of a third embodiment of the carrying device corresponding to the illustration in FIG. 9A, with an at least approximately rhomboid shaped insertion section of the clamping element and a feedthrough perpendicular to the maximum expansion of the insertion section in a direction perpendicular to the insertion direction oriented lead-through for a strap.
FIG. 11 illustrates a schematic view of a fourth embodiment of the carrying device corresponding to the illustrations in FIGS. 9A and 9B with a cylindrical insertion section with thorns.
FIG. 12 illustrates a schematic side view of a fifth embodiment of the carrying device corresponding to the illustrations in FIGS. 9A and 9B with a cylindrical insertion section with thorns and a small feedthrough for a ring.

A second embodiment of the carrying device 102 illustrated in FIGS. 9A and 9B differs from the first embodiment illustrated in FIGS. 1 to 8 as it provides for a clamping element 106 that is not rotationally symmetrical. Rather, the clamping element 106 features an insertion section 138 that essentially is arrow-shaped.

Preferably, the insertion section 138 is made of elastic, for example a rubber-like material or spring steel with a low material thickness, so that the insertion section 138 can be easily and without much effort inserted into and removed from the recess 134 for the clamping element 106.

The insertion section 138 is adjoined with an integrally formed, essentially ring-shaped element 171 which has a feedthrough 154 for feeding through a strap (not shown) that, for example, can be used to hang the carrying device 102 around the neck of the dog owner. The feedthrough 154 is oriented parallel in a direction in which the insertion section 138 of the clamping element 106 has its maximum expansion in a direction perpendicular to the insertion direction 142.

The use of a belt-like strap for hanging the clamping element 106 prevents twisting of the strap and it ensures that the strap evenly fits the shape of the body of the dog handler.

Moreover, the illustrations of the second embodiment of the carrying device 102 in FIGS. 9A and 9B coincide with the first embodiment in FIGS. 1 through 8 both in terms of structure and function, and to which aforementioned descriptions is made reference to in this respect.

A third embodiment of the carrying device 102 illustrated in FIG. 10 differs from the second embodiment illustrated in FIGS. 9A and 9B in that its essentially ring-shaped element 171 features a feedthrough 154 which is oriented at least approximately perpendicular to a direction in which the insertion section 138 of the clamping element 106 has its maximum expansion in a direction perpendicular to the insertion direction 142.

Furthermore, the third embodiment of the carrying device 102 illustrated in FIG. 10 comprises an at least approximately rhomboid shaped, flattened insertion section 138.

Moreover, the illustration of the third embodiment of the carrying device 102 in FIG. 10 coincides with the second embodiment in FIG. 9A and FIG. 9B both in terms of structure and function, and to which aforementioned descriptions is made reference to in this respect.

A fourth embodiment of the carrying device 102 illustrated in FIG. 11 differs from the third embodiment illustrated in FIG. 10 in that its insertion section 138 comprises a cylindrically shaped section 172 with outward leaning thorns, oriented perpendicular to the cylindrical section 172 on the end opposite to that attached to the ring-shaped element 171. The insertion section 138 is therefore essentially T-shaped.

Moreover, the illustration of the fourth embodiment of the carrying device 102 in FIG. 11 coincides with the third embodiment in FIG. 10 both in terms of structure and function, and to which aforementioned descriptions is made reference to in this respect.

A fifth embodiment of the carrying device 102 illustrated in FIG. 12 differs from the fourth embodiment illustrated in FIG. 11 in that it provides for a feedthrough 176 in the cylindrical section 172 instead of an at least approximately ring-shaped element 171, and that the feedthrough 176, for example, can be equipped with a key-chain-like ring 178 which can host the strap of the carrying device 102. The clamping element 106 is thus not integrally build, but rather made of two pieces.

Moreover, the illustration of the fifth embodiment of the carrying device 102 in FIG. 12 coincides with the third embodiment in FIG. 11 both in terms of structure and function, and to which aforementioned descriptions is made reference to in this respect.

Figure 14:
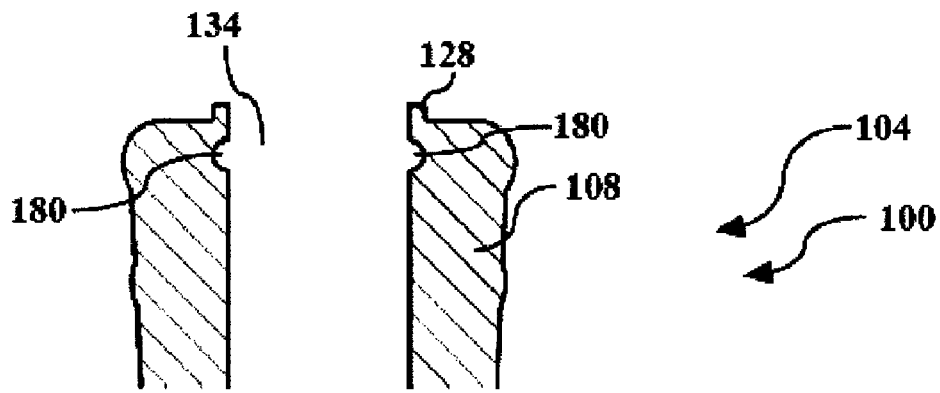
FIG. 14 illustrates a schematic view of a second embodiment of a motivational object corresponding to the illustration in FIG. 13 with a concave indentation in the recess of the bite body.

FIG. 14 shows a second embodiment of a motivational object 104 that differs from the first embodiment of a motivational object 104 illustrated in FIGS. 1 through 8 and FIG. 13, in that the recess 134 for the clamping element 106 provides for a concave indentation 180 instead of the protrusion 140 shown in FIG. 13.

Moreover, the illustration of the second embodiment of the motivational object 104 in FIG. 14 coincides with the first embodiment shown in FIGS. 1 through 8 and FIG. 13 both in terms of structure and function, and to which aforementioned descriptions is made reference to in this respect.

Figure 15:
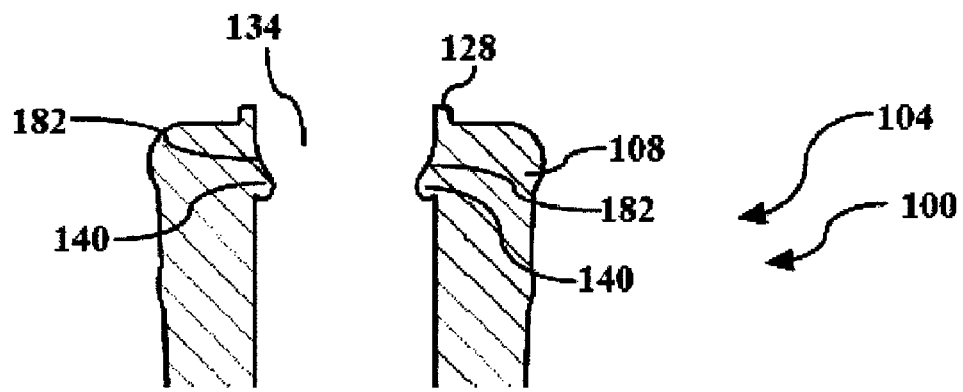
FIG. 15 illustrates a schematic view of a third embodiment of a motivational object corresponding to the illustration in FIG. 13 with a gently or flat sloping flank on the protrusion in a direction opposite to the insertion direction.

A third embodiment of the motivational object 104 illustrated in FIG. 15 differs from the first embodiment illustrated in FIGS. 1 through 8 and FIG. 13, in that the protrusion 140 comprises of a gently or flat sloping flank 182 in a direction opposite to the insertion direction 142. This ensures a particularly easy insertion of the insertion section 138 into the recess 134 for the clamping element 106.

Moreover, the illustration of the third embodiment of the motivational object 104 in FIG. 15 coincides with the first embodiment shown in FIGS. 1 through 8 and FIG. 13 both in terms of structure and function, and to which aforementioned descriptions is made reference to in this respect.

Figure 16:
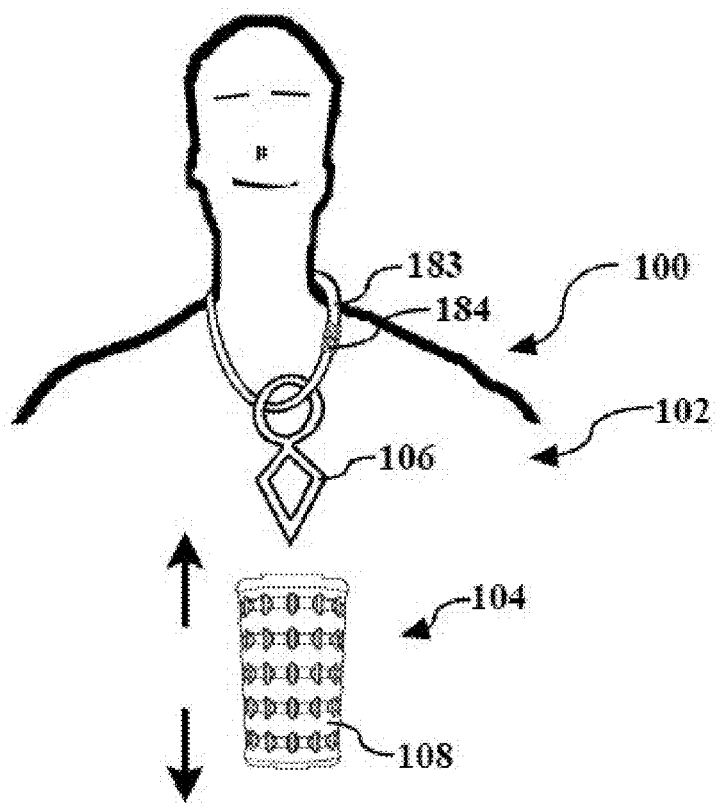
FIG. 16 illustrates a schematic representation of the use of the combination of the carrying device and the motivational object, wherein the clamping element is hung around the neck of a user on a strap with quick-release fastener.

FIG. 16 shows a combination 100 of a motivational object 104 and the third embodiment of the carrying device 102 illustrated in FIG. 10, wherein, for example, a cord, plastic-band or belt shaped strap 183 with a quick-release fastener is fed through the ring-shaped element 171 and hung around the neck of a dog owner. Preferably, the length of the strap 183 is adjustable.

Moreover, the illustration of the combination 100 in FIG. 16 coincides with the first embodiment of the motivational object 104 and the carrying device 102 shown in FIGS. 1 through 8 and FIG. 13, and to which aforementioned descriptions is made reference to in this respect.

Figure 17:
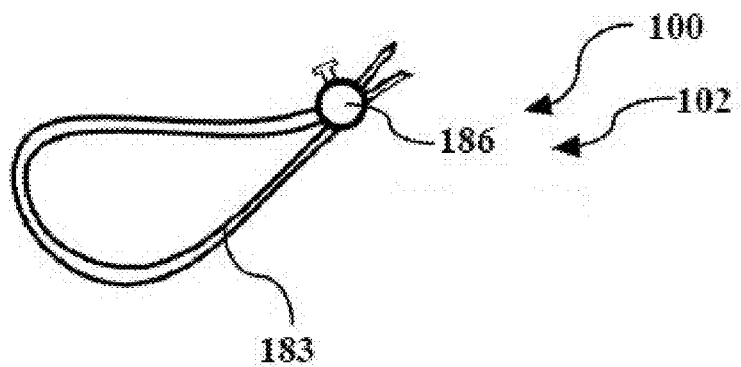
FIG. 17 illustrates a further embodiment of a strap for hanging a clamping element around a user's neck shown in FIG. 16 including a clamping fastener.

The strap 183 for suspending or carrying the carrying device 102 along with the motivational object 104 illustrated in FIG. 17 differs from the strap 183 illustrated in FIG. 16 in that it provides for a clamping fastener 186 or especially an eyed clamping fastener instead of a quick-release fastener.

Moreover, the strap 183 illustrated in FIG. 17 coincides with the strap 183 shown in FIG. 16, and to which aforementioned description is made reference to in this respect.

Figure 18:
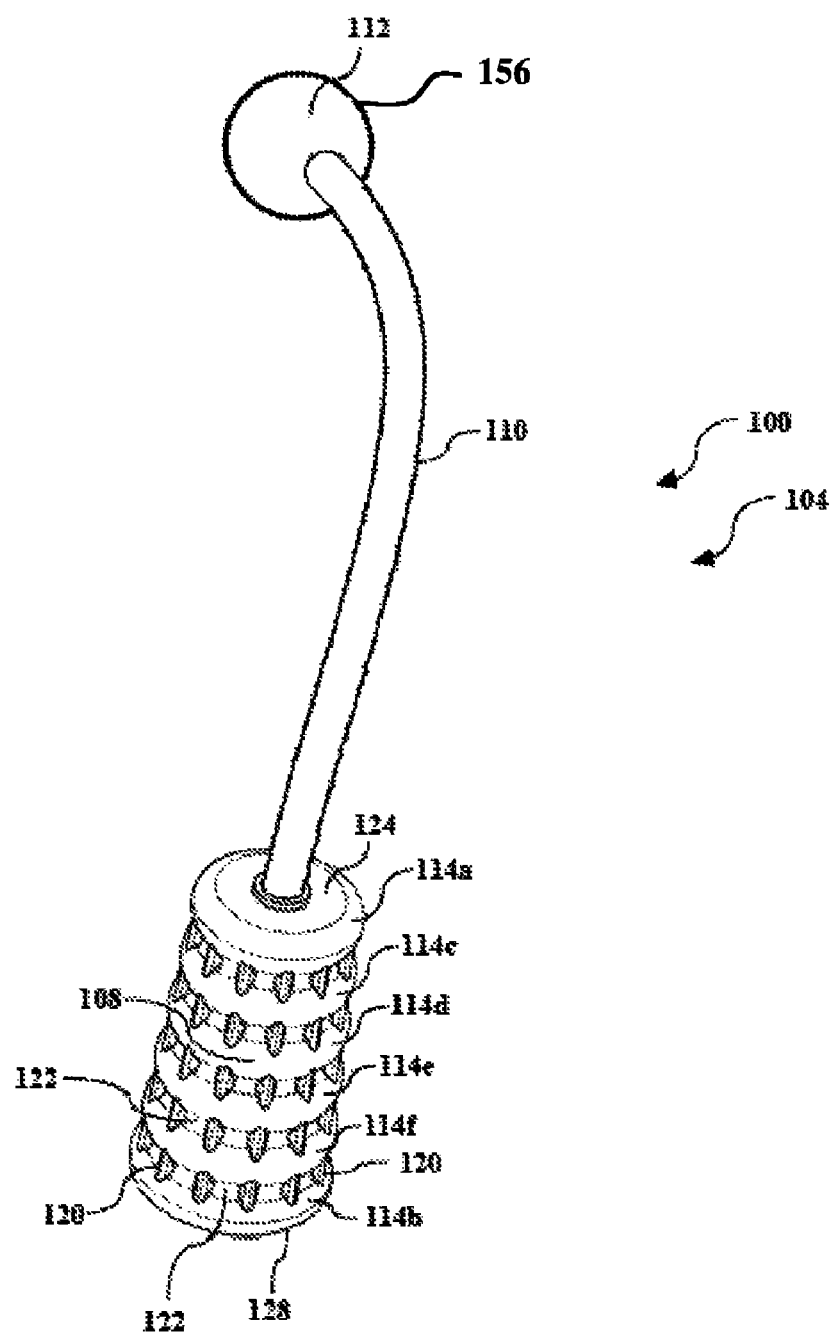
FIG. 18 illustrates a schematic, perspective view of a fourth embodiment of the motivational object, with an essentially conical bite body and one connecting element arranged on its upper abutting face.

The fourth embodiment of the motivational object 104 illustrated in FIG. 18 differs from the first embodiment illustrated in FIG. 1 through 8 and FIG. 13, in that the handle 112 comprises an essentially spherical holding device 156.

Moreover, the illustration of the fourth embodiment of the motivational object 104 in FIG. 18 coincides with the first embodiment shown in FIG. 1 through 8 and FIG. 13 both in terms of structure and function, and to which aforementioned descriptions is made reference to in this respect.

Figure 19:
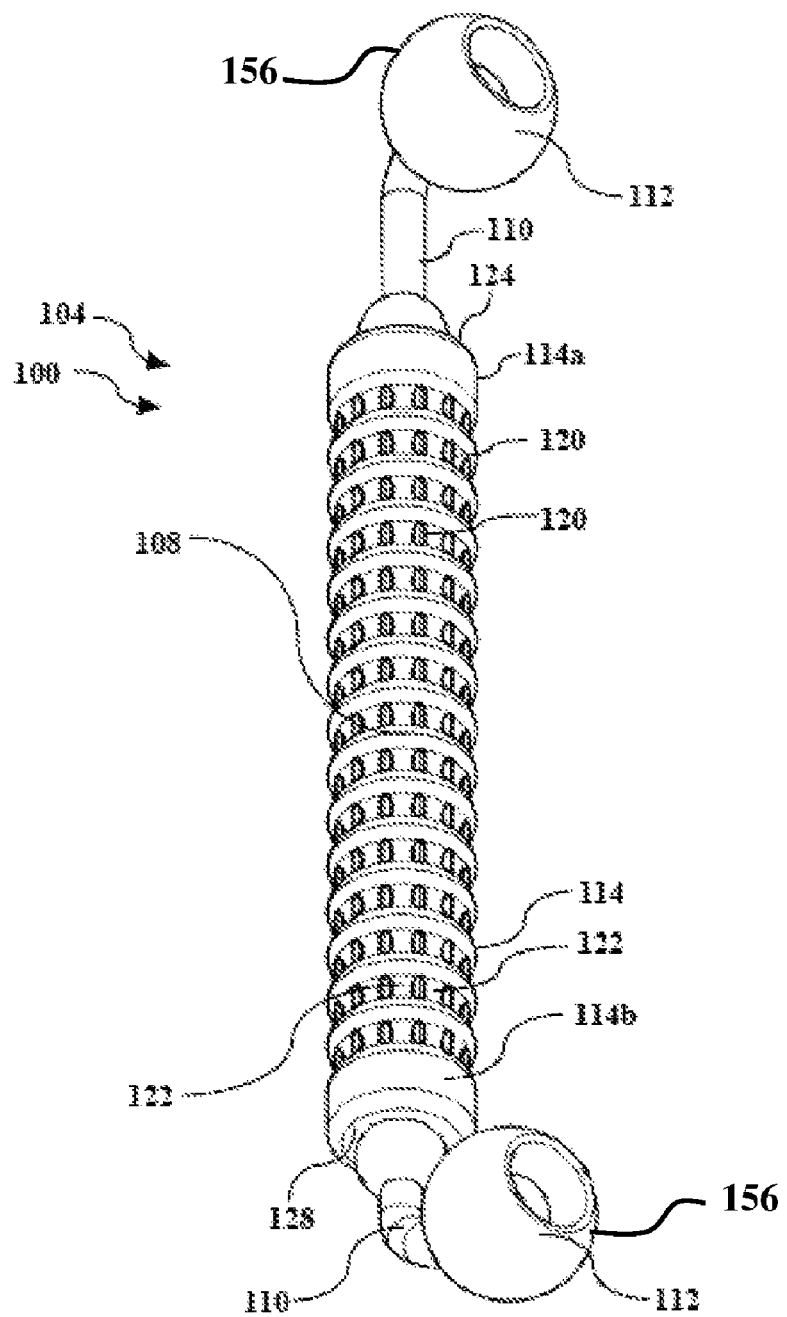
FIG. 19 illustrates a schematic, perspective view of a fifth embodiment of the motivational object, with an essentially cylindrical bite body and two connecting elements arranged on both of its abutting faces.

The fifth embodiment of the motivational object 104 illustrated in FIG. 19 differs from the fourth embodiment illustrated in FIG. 18, in that the bite body 108 is essentially cylindrically shaped, and that a connecting element 110 with one handle 112 each arranged on its abutting face 124 and on the basal area 128.

Figures 20, 21:
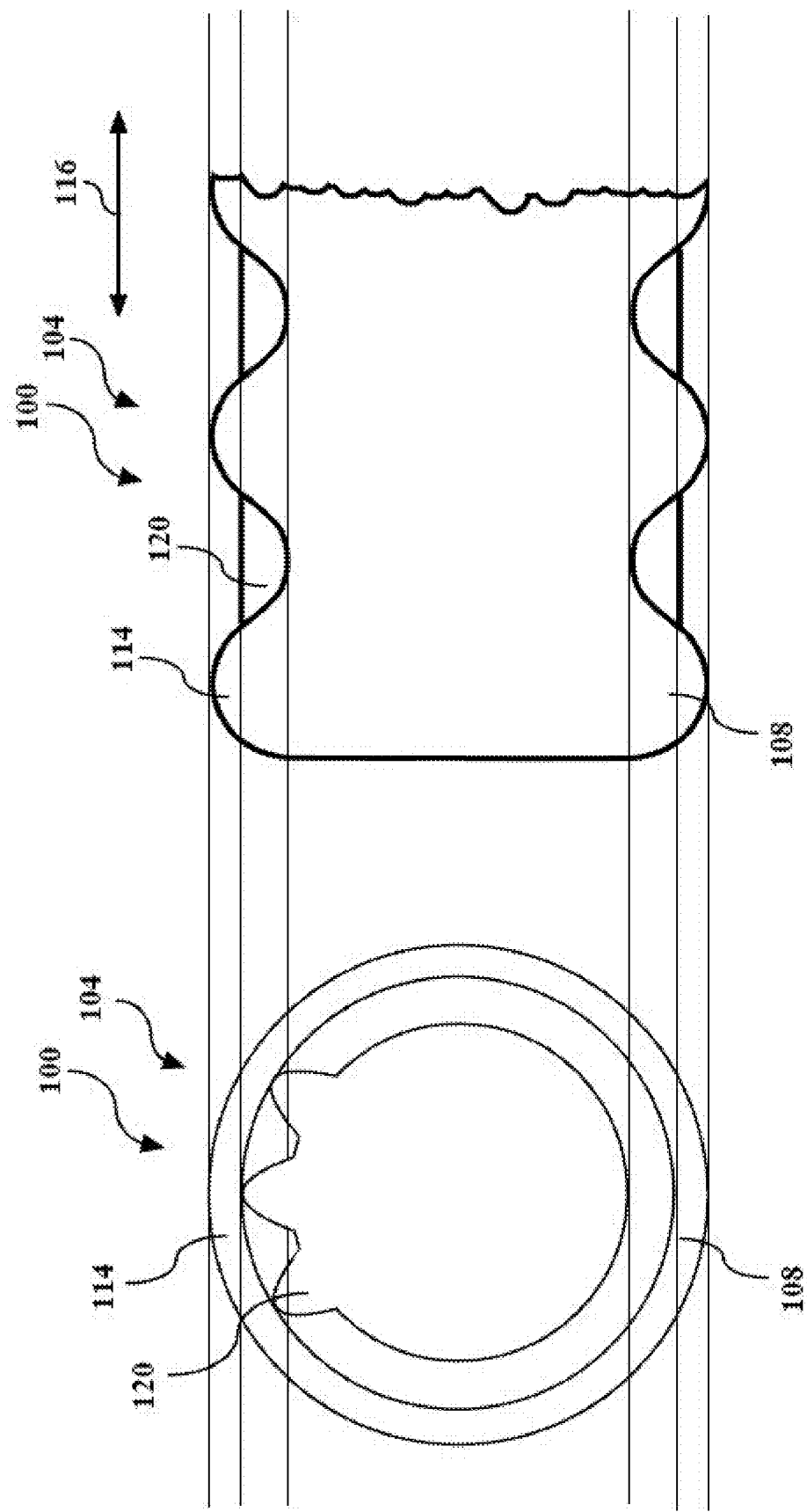
FIG. 20 illustrates a schematic view of a cross section through the bite body in FIG. 19 between two annular bulges.
FIG. 21 illustrates a schematic view of a longitudinal section through the bite body in FIG. 19.

As particularly shown in FIG. 20 and FIG. 21, the fifth embodiment of the motivational object 104 features longitudinal webs 120 with a smaller radial extension than the annular bulges 114.

Moreover, the embodiments of the motivational object 104 illustrated in FIGS. 19 through 21 coincide with the first embodiment of the motivational object 104 in FIG. 18 both in terms of structure and function, and to which aforementioned descriptions are made reference to in this respect.

Figure 22:
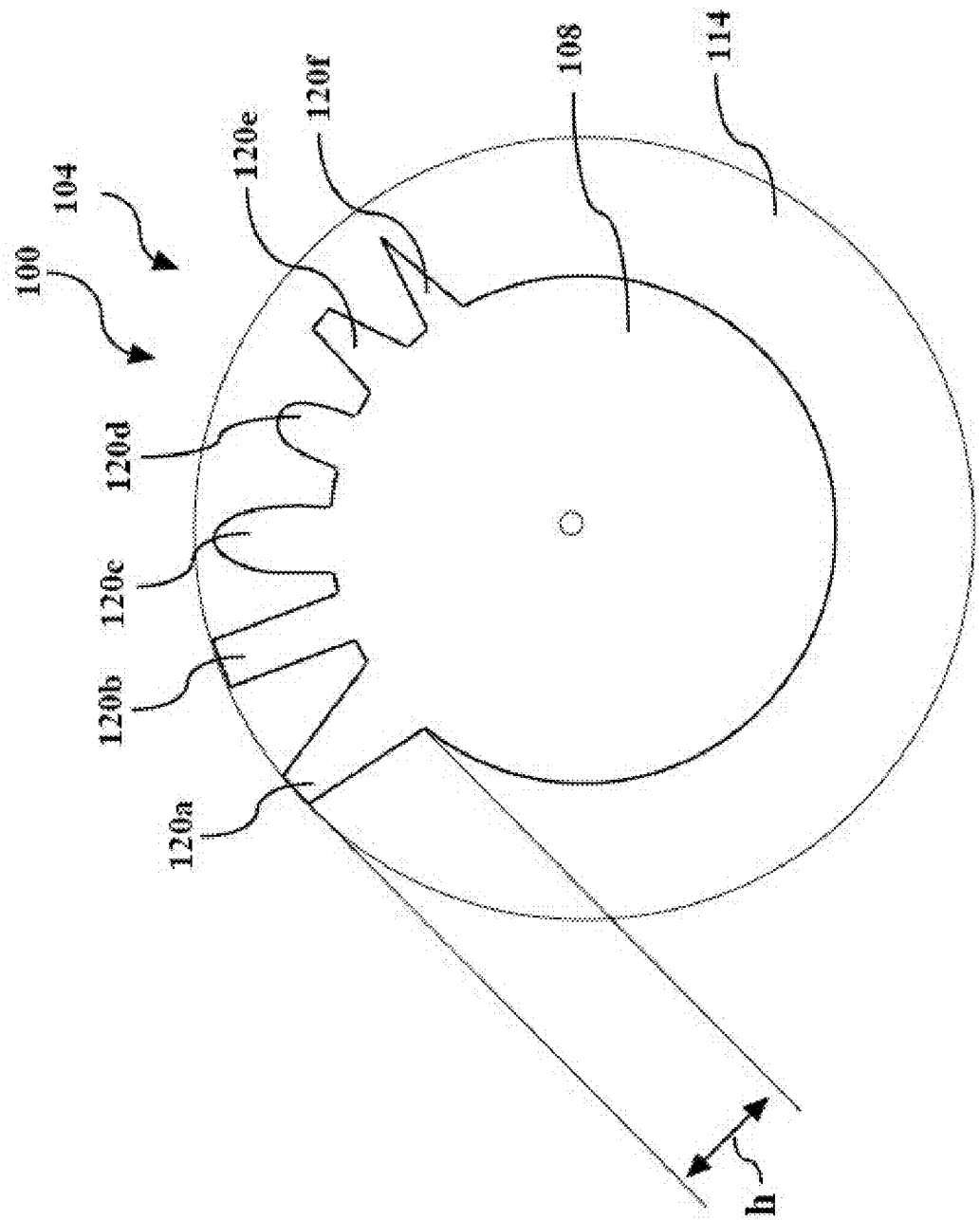
FIG. 22 illustrates a schematic view of a cross section through the bite body in FIG. 20, with a multitude of embodiments of longitudinal webs.

FIG. 22 illustrates different embodiments of longitudinal webs 120.

In principle, the radial expansion of the longitudinal webs 120 relative to the radial expansion of the annular bulges 114 may be chosen freely. However, since increasing the height of the longitudinal webs 120 constructionally also affects the distance between the longitudinal webs 120 and thus moves apart the troughs 122 which serve as possible holding points for a dog, such increase of the height of the longitudinal webs 120 above the height "h" of the annular bulges 114 would be detrimental to the motivational object 102. This is avoided by providing for a radial expansion of the longitudinal webs 120 that is smaller than the radial expansion of the annular bulges 114.

In particular, it can be provided that the radial expansion of the longitudinal webs 120 is chosen approximately 5 mm smaller than the radial expansion of the annular bulges 114.

The cross sections of preferred embodiments of longitudinal webs 120 illustrated in FIG. 22 are in detail:

One longitudinal web 120a with an essentially trapezoidal shaped cross-section, which is extending in radial direction up to the maximum extension "h" of the annular bulges 114;

One longitudinal web 120b with an essentially rectangular shaped cross-section, which is extending in radial direction up to the maximum extension "h" of the annular bulges 114;

One longitudinal web 120c with an essentially U-shaped cross-section, which is extending in radial direction to approximately 80% of the maximum extension "h" of the annular bulges 114;

One longitudinal web 120d with an essentially U-shaped cross-section, which is extending in radial direction to approximately 50% of the maximum extension "h" of the annular bulges 114;

One longitudinal web 120e with an essentially trapezoidal shaped cross-section, which is extending in radial direction to approximately 60% of the maximum extension "h" of the annular bulges 114;

One longitudinal web 120f with an essentially V-shaped cross-section, which is extending in radial direction to approximately 70% of the maximum extension "h" of the annular bulges 114;

All longitudinal webs 120 illustrated in FIG. 5, as well as longitudinal webs 120 with feature combinations of the longitudinal webs 120 described above, such as radially, in direction of the maximum extension "h" of the annular bulges 114 extending longitudinal webs 120, with essentially U-shaped cross-sections, are all suitable embodiments for the motivational object 104.

Because the bite body 108 comprises of a recess 132 that allows for the insertion of the insertion section 138 of the clamping element 106 of the carrying device 102, the at least one motivational object 104 can be easily carried or stored when it is not in use.

I claim:

1. A motivational object for dogs, comprising:
a bite body comprising:
a recess configured for detachably mounting said bite body to a carrying device;
a first outer annular bulge, a second outer annular bulge, and one more annular bulges arranged between the first outer annular bulge and the second outer annular bulge, wherein the one or more annular bulges are arranged in parallel along a longitudinal direction of the bite body, wherein the circumferential area of the bite body comprises a plurality of troughs disposed adjoining the one or more annular bulges; and a plurality of longitudinal webs extending in said longitudinal direction and distributed over an entire length of the bite body between the first outer annular bulge and the second outer annular bulge.

2. The motivational object of claim 1, wherein an envelope of the bite body is generally frustoconically shaped.

3. The motivational object of claim 1, wherein an envelope of the bite body is generally conically shaped.

4. The motivational object of claim 1, wherein an envelope of the bite body is generally cylindrically shaped.

5. The motivational object of claim 1, wherein the plurality of troughs are formed by the one or more annular bulges and the plurality of longitudinal webs running approximately in the longitudinal direction of the bite body.

6. The motivational object of claim 1, wherein the one or more annular bulges and the plurality of longitudinal webs distributed on the circumferential area of the bite body are arranged in a grid-like configuration.

7. The motivational object of claim 1, further comprising a connecting element and a handle having a holding device approximately rotationally symmetrical about the axis of rotation of the handle.

8. The motivational object of claim 7, wherein the holding device further comprises a concave section and a cylindrical section, wherein holding device comprises an approximately cylindrical recess in said concave section along the axis of rotation of the holding device and an approximately hemispherical recess in said cylindrical section, wherein said at least approximately cylindrical recess is configured to receive one end of the connecting element.

9. The motivational object of claim 7, wherein said holding device comprises a bite body facing concave section and a bite body averted cylindrical section, wherein said holding device is fixedly attached to the connecting element on a side opposite to the abutting area of the bite body.

10. The motivational object of claim 7, wherein said handle comprises a generally spherically shaped holding device, wherein said holding device is fixedly attached to the connecting element on a side opposite to the abutting area of the bite body.

11. The motivational object of claim 7, wherein one end of said connecting element is attached on an abutting area of the bite body.

12. The motivational object of claim 1, wherein said carrying device comprises a clamping element, wherein said clamping element is detachably attached to the bite body.

13. The motivational object of claim 12, wherein said clamping element comprises an insertion section, wherein the insertion section of the clamping element is configured for insertion into the recess in an insertion direction.

14. The motivational object of claim 1, further comprising a feedthrough, wherein said feedthrough penetrates through the center of the bite body in a longitudinal direction, wherein said feedthrough comprises said recess for the connecting element in the abutting area of the bite body and a recess for the clamping element in the basal area of the bite body.

15. The motivational object of claim 14, wherein said recess for connecting the clamping element further comprises a protrusion that protrudes into a cavity formed by the recess, wherein said protrusion is elastically designed to secure the insertion section of the clamping element when said clamping element is inserted in said recess on the basal area of the bite body.

16. The motivational object of claim 15, wherein the protrusion in the recess comprises of a steep sloping flank in an insertion direction of insertion of the insertion section into the recess.

17. The motivational object of claim 14, wherein the recess for the clamping element is approximately rotationally symmetrical about an axis of rotation of the clamping element and about an axis of rotation of the bite body.

18. The motivational object of claim 14, wherein the recess of the bite body is approximately complementary to a shape of the insertion section of the clamping element.

19. The motivational object of claim 14, wherein the recess for the clamping element near the basal area comprises a concave indentation within said recess, wherein said concave indentation in said recess is at least approximately complementary to a convex protrusion of the clamping element.

20. A motivational object for a dog, comprising:

a generally frustoconically shaped bite body, comprising:
 a feedthrough, wherein said feedthrough comprises a first recess in an abutting area of the bite body and a second recess in a basal area of the bite body;
 a first outer annular bulge, a second outer annular bulge, and one more annular bulges arranged between the first outer annular bulge and the second outer annular bulge, wherein the one or more annular bulges are arranged in parallel along a longitudinal direction of the bite body, wherein the circumferential area of the bite body comprises a plurality of troughs disposed adjoining the one or more annular bulges; and
 a plurality of longitudinal webs extending in said longitudinal direction and distributed over an entire length of the bite body between the first outer annular bulge and the second outer annular bulge;

a carrying device comprising a clamping element, wherein said clamping element is detachably attached to said bite body through the second recess in the basal area of the bite body; and a connecting element attached to the first recess in the abutting area of the bite body, said connecting element comprising a handle, wherein said handle comprises a holding device;

wherein said clamping element is detachably inserted into the second recess through the basal area of the bite body, thereby forming the carrying device of the motivational object, and wherein the connecting element with the handle is inserted into the first recess through the abutting area of the bite body;

whereby the handle of the motivational object allows the motivational object to be hurled and whereby said one or more annular bulges and said longitudinal webs of the bite body ensures a secure hold of the motivational object in a muzzle of the dog.

* * * * *